July 12, 1932.   M. A. KRETCHMAR   1,866,977
MEANS FOR LUBRICATING MACHINERY
Filed June 3, 1925   3 Sheets-Sheet 1
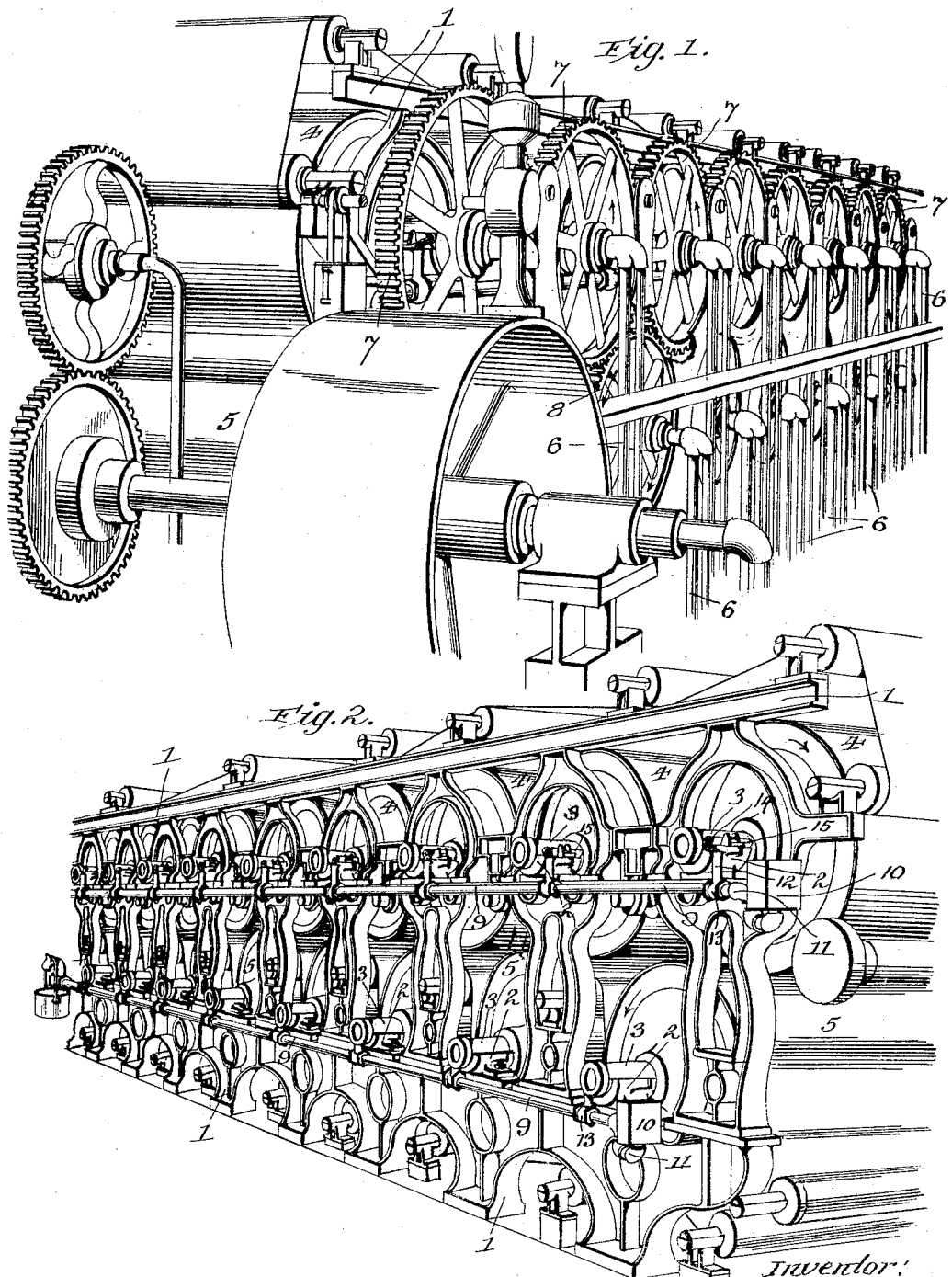

July 12, 1932.  M. A. KRETCHMAR  1,866,977
MEANS FOR LUBRICATING MACHINERY
Filed June 3, 1925   3 Sheets-Sheet 2
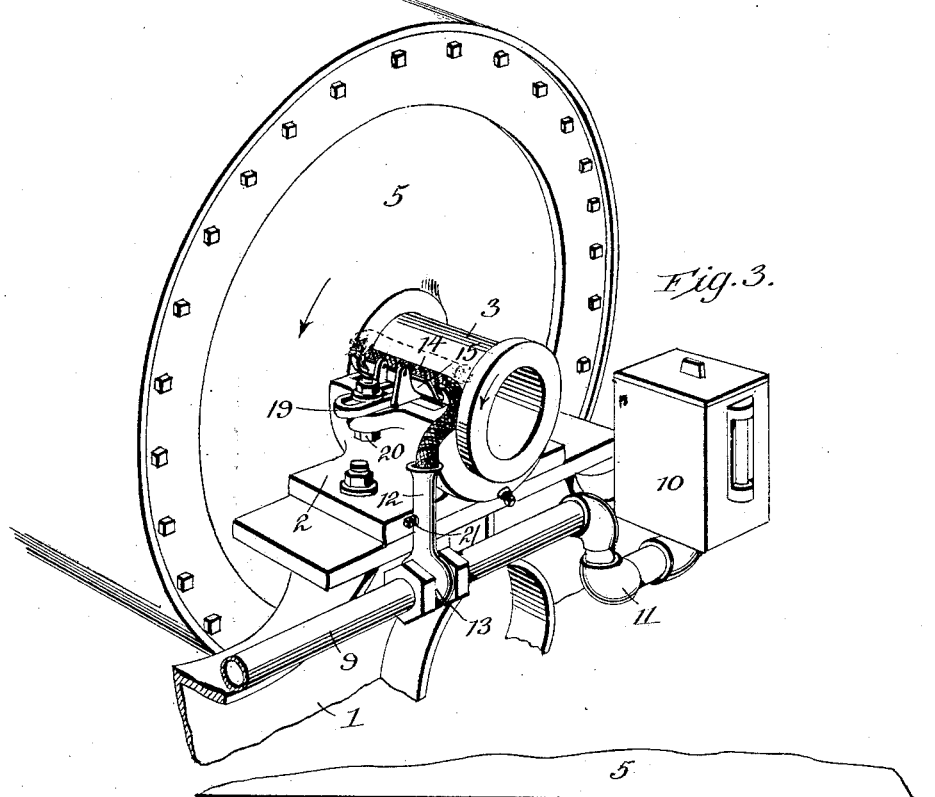
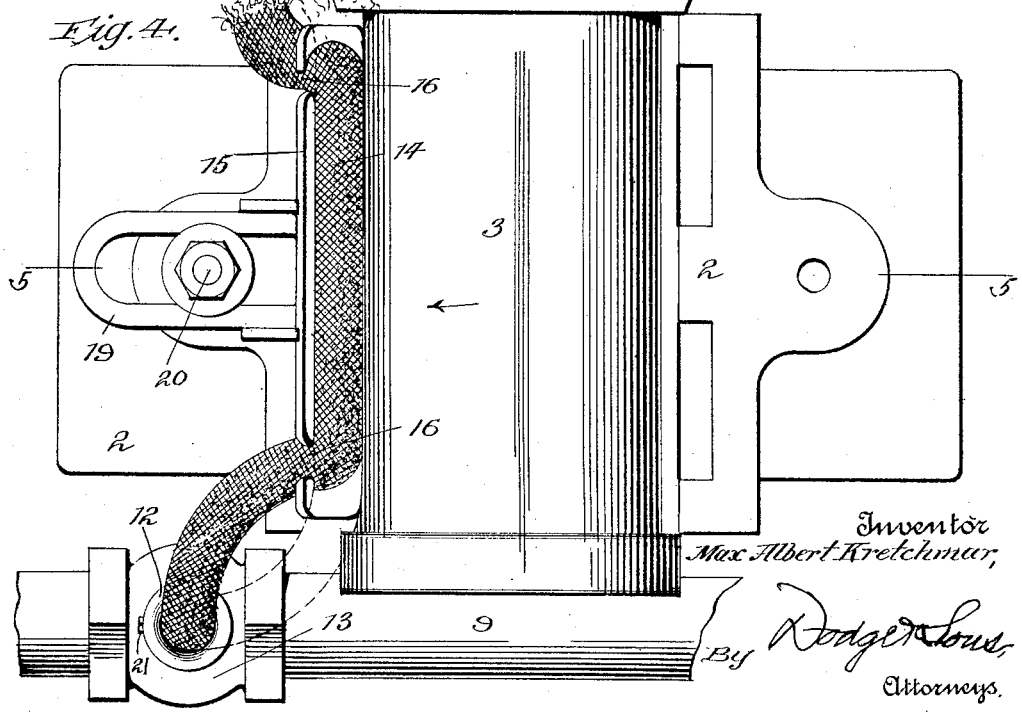

July 12, 1932.  M. A. KRETCHMAR  1,866,977
MEANS FOR LUBRICATING MACHINERY
Filed June 3, 1925  3 Sheets-Sheet 3
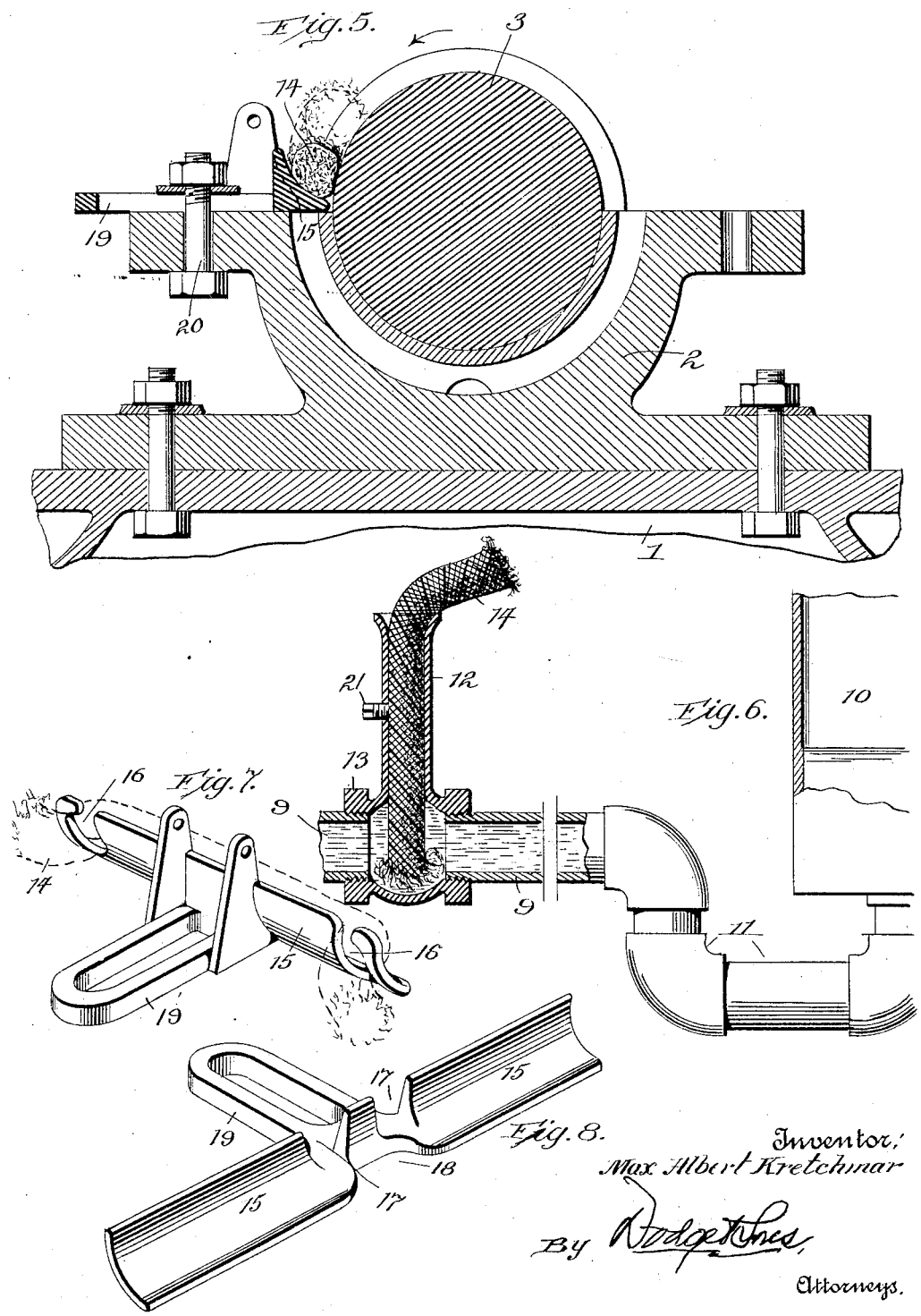

Patented July 12, 1932

1,866,977

UNITED STATES PATENT OFFICE

MAX ALBERT KRETCHMAR, OF ALBANY, NEW YORK, ASSIGNOR TO HORROCKS DESK COMPANY, OF HERKIMER, NEW YORK, A CORPORATION OF NEW YORK

MEANS FOR LUBRICATING MACHINERY

Application filed June 3, 1925. Serial No. 34,638.

This invention pertains to lubrication of journals and bearings, slides, etc., and though susceptible of wide application, is designed more particularly to afford and maintain effective lubrication where the parts to be lubricated are inaccessible or difficult of access during operation of the machinery of which they form a part; where the weight or load is considerable or great; where journals and bearings are kept at relatively high temperature by reason of the maintenance of heat in a drum, cylinder, or part which they support and carry; where relatively high speeds of rotation are imparted to the journals; and in similar situations and under conditions tending to make difficult the measured, constant and uniform supply of lubricant to and its even distribution over the opposed surfaces.

It is now well established and generally recognized that ideal lubrication involves the formation and maintenance of a film of lubricant between a moving part and its bearing, sufficient to support the moving element and its load, and to prevent actual contact of the fixed and moving parts with the machinery running at normal speed, under temperature conditions normal to the particular machinery and to the work performed, and with the customary load or weight upon the parts. These factors of course differ with different classes of machinery and work.

The above-noted conditions and often others not specifically mentioned, determine the character of the lubricant most suitable in any given case. The greater the load upon the journals, the greater is the tendency to press or squeeze out the lubricant, and to destroy in whole or in part the film of lubricant separating the opposed surfaces; the greater the speed, the load, or both, the greater the tendency to generate heat, hence due regard must be given to these and other factors. So, too, the mode of and means for delivering the lubricant to such surfaces should be such as to prevent an excess on the one hand or a deficiency on the other; to care for or take away the used lubricant; and to maintain a constant and measured supply of fresh lubricant to replace that used and removed. The same lubricant may be re-used for a considerable time, but preferably with occasional additions of fresh or unused lubricant.

Paper making machinery presents peculiar and exceptionally difficult problems of lubrication, because the journal load is heavy in much of this class of machinery, and in drying, calendering, and other machines employed in paper manufacture, there is the added presence of heat transmitted from the steam heated rolls, cylinders or drums to their journals and bearings. This heat tends to thin the lubricant, for which reason a thicker, heavier, or more viscous lubricant must be employed than would otherwise be necessary, and this is especially true in hot weather and in warm climates.

It is undesirable to arrest the operation of machinery in general, and peculiarly so in the case of paper making machinery, because of the loss of time and the production of inequalities in the continuous web being formed. In no other field, probably, is perfect lubrication at once so necessary and so difficult; but by the method and means now to be described, the problem, which has been of long standing, is completely solved, with a resulting economy in power and consequently in fuel, increased speed and output, absence of grease, oil, or lubricant about the machinery, on the floors and belting, heretofore unavoidable, and generally improved conditions of operation.

The invention is, as above intimated, peculiarly adapted for paper-making machinery, and for journals which rest upon and are supported by bearings beneath them, as contradistinguished from railway car axles and bearings, wherein the axle journals are beneath and give support to the bearings carried by the trucks, which in turn support and carry the car bodies. It will be noted that the bearings in the one case are below and in the other case above the journals to be lubricated, and this difference introduces special conditions, requirements, and possibilities, as will be pointed out later in this description.

The invention will be described in connection with the accompanying drawings, wherein:

Figure 1 is a perspective view of the rear or driving side of a line of drying or calendering rolls for use in paper making, designed to show the conditions under which lubrication must be effected therein;

Fig. 2, a similiar view of such machine from the front or opposite side as related to Fig. 1, showing the lubricating system;

Fig. 3, a perspective view of one journal and its bearing, equipped with the novel lubricating means and showing the oil pipe or main and the reservoir therefor;

Fig. 4, a top plan view of the same, indicating two variant arrangements of the wick;

Fig. 5, a vertical transverse section on the line 5—5 of Fig. 4;

Fig. 6, an elevation, partly in section, of the oil pipe or main, the upright wick tube, and the oil reservoir;

Fig. 7, a perspective view of the horizontal support for holding that portion of the wick which contacts with the journal, the support shown in this figure being the one illustrated in Figs. 3, 4 and 5; and Fig. 8, a perspective view showing a modified form of the part shown in Fig. 7.

Referring first to Figs. 1 and 2, 1 designates the main frame of a portion of a paper making machine, provided with two horizontal rows or tiers of bearings 2, in which are carried the journals 3 of an upper series 4 and a lower series 5 of hollow cylinders or drums of like character, to and from which steam is carried by pipes 6 for maintaining them at a suitable and quite high temperature. The cylinders of the upper series alternate with or are in staggered relation to those of the lower series, and turn in one direction, those of the lower series turning in the opposite direction, for which purpose their shafts are provided with intermeshing gears wheels 7 and 8, as seen in Fig. 1. The paper web is shown in the drawings as passing over successive cylinders of the upper series and beneath interposed rollers, to the end of said series; thence beneath successive cylinders of the lower series and over intermediate rolls, back to the starting end; but the travel of the web may be, and is, differently arranged in different machines of the general type.

The journals 3 and their bearings 2 at the rear side of the machine are placed intermediate the cylinder heads or ends and the gear wheels, which wheels are largely covered in by a plate to avoid injury to attendants. They are hence inconvenient of access even when the machine is at rest. It is wholly impracticable to pass an oiler between the spokes of the gear wheels to oil the bearings while the machine is in operation, and if a journal or bearing runs dry and develops undue heat, it becomes necessary to stop the machine, cool the journal and bearing down to a safe temperature, and supply them with lubricant before again starting the machine. If such heat develops while the machine is temporarily unattended, serious consequences often result, causing delay, expense and serious loss to the plant. In either case there is loss of time and product, and inequalities in the paper.

Grease cups, siphon oilers, force feed systems, gravity systems, and other plans of lubrication, have been tried but without satisfactory results, and with all prior systems there has been great waste of lubricant, and an unavoidable dripping thereof upon different parts of the machine, on the floor, and not unfrequently on the belting and on the paper web.

Under the plan here disclosed, oil of suitable character and consistency, but variable according to conditions, is used as the lubricant, and for its delivery to the various bearings there is carried upon suitable brackets or supports secured to frame 1, and at a short distance below each line of bearings and journals, an oil pipe 9 having at one end a reservoir or tank 10, the top of which rises above the level of pipe 9, to which its bottom is attached by a goose-neck or U-shaped section 11, as shown in Figs. 2, 3 and 6. The opposite end of pipe 9 may be closed or provided with a raised overflow and a receptacle to catch any lubricant that may be discharged therefrom, such discharge being incident to occasional additions of fresh oil to the supply in the reservoir and pipe line. The height of the overflow will be such as to ensure a filling of the pipe line before any discharge of oil can take place, and in practice it is found desirable to make it such as to ensure a rise of the oil in the branch pipes to a height somewhat above that of the main pipe.

Rising from each pipe 9 at points just to one side of each journal bearing 2, is an upright pipe or branch 12 which may conveniently be made integral with a coupling 13, which can be introduced into pipe 9 wherever desired by cutting the pipe, shortening it slightly, threading its ends, and screwing the coupling and the pipe sections together, as seen in Figs. 3 and 6. Each pipe branch 12 constitutes a receiver or holder for one end of a wick 14, and the upper end of each holder is flared or bell-mouthed to permit the free fitting wick to be bent over in any desired direction to reach and lie upon a curved support 15, of which there is one for each journal, adjustably secured to the journal bearing, as shown in Figs. 3, 4 and 5. The wick support 15 may vary somewhat in form, but I prefer to adopt the form shown in Fig. 7 for plain bearings or boxes, and the form shown in Fig. 8 for bearings and journals equipped with an oiling ring hung upon the journal and dipping into an oil well beneath the journal, the apparatus here described being designed and adapted for application to machinery already in use, much of which is provided with special lubricating equipment. In each form of wick support notches or openings 16 or 17 are provided in the upper edge thereof, through which the wick 14 is led to prevent its drawing longitudinally of said support. In Fig. 8 these notches or openings are located at each side of the midlength of the support 15, so that the wick may be bent outward around the intermediate upstanding portion of the support to clear a recess 18 in its lower edge, made to afford clearance for an oiling ring such as above referred to.

The support 15, in either form, is provided with a slotted rearwardly projecting arm 19, to receive a fastening bolt 20, Figs. 3, 4 and 5, which may be loosened to permit proper adjustment of said support, and tightened to fix it at such adjustment. The curved face of support 15 is turned toward the journal and moved to a point just permitting proper clearance, and the wick 14 is bent over from its supporting branch pipe 12 and laid upon the curved face, as seen in Figs. 3, 4 and 5, the space and the inclination of support 15 being such that gravity will cause the surface of the wick to press lightly against the journal. The journal turns counter-clockwise as indicated by the arrow in Fig. 5, and it is obvious that the effect of the frictional engagement of the journal with the wick thus held in contact with it by gravity is to draw said wick into close contact with the journal with a force which is dependent on such frictional engagement between the journal and the wick and the inclination of support 15.

The wick is placed on the down-moving side of the journal, which hence tends to draw or to hold said wick down to its seat on the support, and develop the thrust component toward the journal as above mentioned.

The wick may be of any suitable character, but I prefer one composed of cotton or linen threads or cords woven into a sheet and rolled into cylindrical form, or braided into such form, and having wire, preferably of copper, woven or braided into it so as to appear on the surface at intervals. The wire tends to maintain the wick in cylindrical form, and to enable it better to resist wear, and also prevents glazing of the wick. I make no claim to such wick per se.

It is found expedient in some cases to make a return fold of the wick on the support 15, or to bend it back upon itself, the first or top stretch serving to wipe off or hold back any dust, grit, or foreign matter lying upon the journal, and the lower stretch, more fully charged with oil, serving to apply fresh oil to the clean or wiped journal. This arrangement is indicated by dotted lines in Figs. 3 and 5.

The capillary action of the wick may be regulated with accuracy by varying the closeness or tightness of weave or braiding, or where made from woven fabric, by varying the tightness of its winding into cylindrical form. It may also be regulated with nicety by varying the diameter of the wick through elongation, or by endwise compression, so as to cause a loose or a relatively tight fit within the branch pipes or holders 12; by a constriction, readily produced by winding one of the wire strands or a cord somewhat tightly about the wick, or effected by a compression screw 21 passing through the wall of the upstanding holder 12, as seen in Fig. 3; or in any other simple and convenient way. The depth of immersion of the wick in the oil may also be varied for a like purpose.

As the wick can carry up only a certain quantity of oil in a given time, and will cease to raise more when fully charged, it follows that it will deliver oil to the journal only to the extent necessary to replace that wiped from said wick by the rotating journal. Practical tests and daily and continuing use on paper making machinery for a considerable period of time, have fully demonstrated the feasibility of very accurate regulation and control of the feed, and the delivery of just the quantity of lubricant necessary to coat the journal with a proper film of oil to maintain separation of the moving journal and the fixed seat or bearing, and this will continue without attention for considerable periods of time. The wear of the wick containing the wire strands is slight and gradual, hence replacements are infrequent. The inclination of the support in feeding the wick toward the journal as a result of the frictional drag of the journal on the wick, is a contributing factor to long service since contact of the wick with the journal is not dependent on maintenance of a fixed diameter for the wick. As the wick diminishes in size, it moves inward to take up the wear. Remarkable economy in oil results from the features above pointed out, arrived at only after long and patient experiment and many changes, but finally attained, and with certainty and uniformity.

While I have described the apparatus in a form for lubricating a number of journals from a common source, it may obviously be made for or applied to a single journal.

In the drawings open or uncapped journal bearings are shown, there being nothing in such machinery causing a tendency of the journals to lift from their bearings; but where such tendency does exist, caps will be employed, each provided with an opening, the lower wall of which will be inclined and will constitute the wick support. Where open bearings are used, light covers may be provided to exclude dust, if this be found necessary.

The oil overflowing at the end of the pipe remote from the reservoir may be reused repeatedly, and until it becomes so viscous or otherwise impaired as to be unfit for further use.

It is to be noted that I do not turn downward the portion of the wick above the branch pipes, and hence do not get a siphoning effect or cause a dripping of oil from the wick. Such action is purposely and carefully avoided, and the wick carries up only sufficient oil to replace that wiped off the wick by the journal and necessary to film or coat the same, the feeding ceasing when the journal ceases to rotate. This avoids the waste of oil or the spreading thereof over the bodies of the pillow blocks in which the bearings are formed, and over the machine frame, and its dripping upon the floor. Such waste, spreading, and dripping are entirely overcome. In other words, through the use of wicks conditioned to lift the oil at a predetermined rate, and to hold it on its surface in quantity sufficient to properly coat or film the journal so long as the latter continues to rotate, I effect a perfect and automatic measuring of the oil and delivery and distribution thereof over the journal in quantity sufficient to maintain the requisite film between the fixed and moving surfaces. The amount of oil fed to the journal is subject to a final regulation by the drag of the journal upon the wick. If the journal tended to become dry its frictional engagement would increase, the wick would be drawn more closely in to the journal, and more oil would be transferred thereto. The tendency is thus toward a stable condition in which the correct amount of oil is fed at all times. Herein resides the most valuable and novel feature of the present invention.

I am aware that wicks dipping into lubricant chambers have heretofore been employed to raise oil to and discharge it upon rotating journals, the surplus oil dropping directly back into the oil receptacle. I am not aware, however, that any one has ever before conceived the idea of automatically measuring, regulating or controlling the quantity of oil supplied, so that the rate of supply to the journal shall be at once adequate to the proper lubrication of such journal and not in excess of the amount necessary thereto, such delivery continuing during rotation of the journal to be lubricated, or the necessary supply of oil being always held by the wick at the point from which it is to be taken by the journal when rotated.

The terms capillary attraction and capillarity are herein used in their broader sense, and as comprising or including surface tension.

It is particularly to be noted that the application of lubricant under the above described construction and arrangement of parts, is made at or near the point of maximum pressure of the journal in or upon its bearing, through the wiping or rubbing action of the journal against the wick and as said journal moves downward. This action produces a measured and uniform film of lubricant over the journal from end to end, at the point where the severest duty begins. The filming of the lubricant is practically independent of its viscosity. The film wiped on in the manner described is hence not removed or liable to be removed in its travel from the point at which the lubricant is received to the arrival of such point above the horizontal plane of the journal axis and back to the point of application. Accordingly, a wide range of viscosity is permissible, and oils of relatively low viscosity may be used where, without this wiping action on the downward moving portion of the journal, oils of materially higher viscosity would be required.

What is claimed is:—

1. Lubricating means for calendering and like machinery, wherein journals of the calendering rolls or drums and bearings for said journals are located between heads of the drums and gear wheels carried by the drums to transmit motion from one to another, said means comprising a bearing and an oil receptacle to stand below each journal; a wick support having its longitudinal axis approximately parallel with the axis of the journal and its surface inclining downwardly and toward the journal; and a wick having a portion extending into the oil receptacle and another portion overlying said support, the parts being so constructed and arranged that the frictional engagement of the journal with the wick urges the wick downward over the support and into thrust engagement with the journal.

2. The combination of a journal; a bearing underlying the same and open at the downwardly-moving side of the journal; an oil receptacle below the journal; a wick support having its longitudinal axis approximately parallel with the axis of the journal and its surface inclining downwardly and toward the journal; a wick having a portion extending into the oil receptacle and another portion overlying said support, the parts being so constructed and arranged that the frictional engagement of the journal with the wick urges the wick downward over the support and into thrust engagement with the journal; and means for adjusting said support toward and from the journal.

In testimony whereof I have signed my name to this specification.

MAX ALBERT KRETCHMAR.